United States Patent
Xu et al.

(10) Patent No.: US 10,679,083 B2
(45) Date of Patent: Jun. 9, 2020

(54) LIVENESS TEST METHOD AND APPARATUS

(71) Applicant: Samsung Electronics Co., Ltd., Suwon-si (KR)

(72) Inventors: Jingtao Xu, Beijing (CN); ByungIn Yoo, Seoul (KR); Jae-Joon Han, Seoul (KR); Chao Zhang, Beijing (CN); Hao Feng, Beijing (CN); Yanhu Shan, Beijing (CN); Yaozu An, Beijing (CN); Changkyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 15/921,740

(22) Filed: Mar. 15, 2018

(65) Prior Publication Data

US 2018/0276489 A1   Sep. 27, 2018

(30) Foreign Application Priority Data

Mar. 27, 2017  (CN) .......................... 2017 1 0192070
Jan. 2, 2018   (KR) ........................ 10-2018-0000230

(51) Int. Cl.
*G06K 9/00* (2006.01)
(52) U.S. Cl.
CPC ..... *G06K 9/00906* (2013.01); *G06K 9/00261* (2013.01); *G06K 9/00281* (2013.01); *G06K 9/00288* (2013.01); *G06K 9/00899* (2013.01)
(58) Field of Classification Search
None
See application file for complete search history.

(56) References Cited

U.S. PATENT DOCUMENTS

| | | | |
|---|---|---|---|
| 7,333,963 B2 | 2/2008 | Widrow et al. | |
| 8,542,879 B1 * | 9/2013 | Nechyba | G06K 9/00228 382/103 |
| 9,025,830 B2 | 5/2015 | Ma et al. | |
| 9,117,109 B2 | 8/2015 | Nechyba et al. | |
| 9,202,119 B2 | 12/2015 | Sezille | |
| 9,202,121 B2 | 12/2015 | Cavallini | |

(Continued)

FOREIGN PATENT DOCUMENTS

| | | |
|---|---|---|
| JP | 2005-316888 A | 11/2005 |
| KR | 10-2004-0015613 A | 2/2004 |

(Continued)

OTHER PUBLICATIONS

Alotaibi, Aziz, and Ausif Mahmood. "Deep face liveness detection based on nonlinear diffusion using convolution neural network." Signal, Image and Video Processing 11.4 (2016): 713-720. (Year: 2016).*

(Continued)

*Primary Examiner* — David Perlman
(74) *Attorney, Agent, or Firm* — NSIP Law

(57) ABSTRACT

Disclosed is a liveness test method and apparatus. A liveness test apparatus determines a pre-liveness score based on a plurality of sub-images acquired from an input image, determines a post-liveness score based on a recognition model for recognizing an object included in the input image, and determines a liveness of the object based on any one or any combination of the pre-liveness score and the post-liveness score.

25 Claims, 11 Drawing Sheets

(56) References Cited

U.S. PATENT DOCUMENTS

| | | |
|---|---|---|
| 9,396,537 B2 | 7/2016 | Hirvonen |
| 9,400,918 B2 | 7/2016 | Yin et al. |
| 9,530,047 B1 | 12/2016 | Tang et al. |
| 2013/0016882 A1* | 1/2013 | Cavallini ............... G06K 9/629 |
| | | 382/117 |
| 2014/0270412 A1 | 9/2014 | Ma et al. |
| 2016/0117544 A1 | 4/2016 | Hoyos et al. |
| 2016/0140436 A1 | 5/2016 | Yin et al. |
| 2017/0083752 A1 | 3/2017 | Saberian et al. |

FOREIGN PATENT DOCUMENTS

| | | |
|---|---|---|
| KR | 10-1412727 B1 | 7/2014 |
| KR | 10-1687217 B1 | 12/2016 |
| WO | WO 2016/084072 A1 | 6/2016 |

OTHER PUBLICATIONS

Andrew Ng, CS229 Lecture Notes: Support Vector Machines, Stanford University, pp. 1-25 (Year: 2018).*

Määttä, J et al. "Face spoofing detection from single images using texture and local shape analysis", *IET Biometrics*, vol. 1, Issue 1, Mar. 1, 2012 (pp. 3-10).

Akhtar, Zahid et al., "Face Spoof Attack Recognition Using Discriminative Image Patches", *Journal of Electrical and Computer Engineering*, Jan. 1, 2016 (15 pages in English).

Extended European Search Report dated Aug. 20, 2018 in corresponding European Patent Application No. 18164299.2 (11 pages in English).

\* cited by examiner

900

1000

LIVENESS TEST METHOD AND APPARATUS

CROSS-REFERENCE TO RELATED APPLICATIONS

This application claims the benefit under 35 USC § 119(a) of Chinese Patent Application No. 201710192070.5 filed on Mar. 27, 2017 in the State Intellectual Property Office of the People's Republic of China and Korean Patent Application No. 10-2018-0000230 filed on Jan. 2, 2018 in the Korean Intellectual Property Office, the entire disclosures of which are incorporated herein by reference for all purposes.

BACKGROUND

1. Field

The following description relates to a liveness test method and apparatus.

2. Description of Related Art

In a user verification system or a user authentication system, a computing device determines whether to allow an access based on verification information provided from a user. The verification information may include information, such as, for example, a password input from the user, a pattern input from the user, and biometric information of the user.

Currently there is an increasing interest on a face anti-spoofing technique in security for user verification. The face anti-spoofing technique verifies whether a face of a user input to the computing device is a fake face or a genuine face. Features, such as, local binary patterns (LBP), histogram of oriented gradients (HOG), and difference of Gaussians, are extracted from an input image and a determination is made whether the input face is the fake face based on the extracted features. Face spoofing may attack photos, moving pictures, masks, and the like. In terms of face verification, it is important to recognize such biometric mimicking.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a liveness test method including determining a pre-liveness score based on sub-images acquired from an input image, determining a post-liveness score based on a recognition model for recognizing an object included in the input image, and determining a liveness of the object based on any one or any combination of the pre-liveness score and the post-liveness score.

The pre-liveness score may include acquiring different types of the sub-images from the input image based on the object included in the input image, determining liveness scores corresponding to the sub-images, and determining the pre-liveness score based on the determined liveness scores.

The sub-images may include any two or any combination of a first sub-image corresponding to an object area that includes the object, a second sub-image corresponding to a partial area of the object area, and a third sub-image corresponding to the object area and a background area of the object.

The determined liveness scores may include a first liveness score corresponding to the first sub-image, a second liveness score corresponding to the second sub-image, and a third liveness score corresponding to the third sub-image, and the first liveness score is determined based on a first liveness test model, the second liveness score is determined based on a second liveness test model, and the third liveness score is determined based on a third liveness test model.

The determining of the liveness scores may include resizing a size of the first sub-image, and determining a first liveness score from the resized first sub-image using a first liveness test model.

The determining of the liveness scores may include acquiring the second sub-image by cropping the partial area from the object area, and determining a second liveness score from the cropped second sub-image using a second liveness test model.

The determining of the pre-liveness score based on the determined liveness scores may include applying a weight to one or more of the determined liveness scores, and determining the pre-liveness score based on a result of the applying of the weight.

The determining of the post-liveness score may include determining fourth liveness scores from feature vectors output from hidden layers within the recognition model, and determining the post-liveness score based on the fourth liveness scores.

The determining of the fourth liveness scores may include determining the fourth liveness scores from the feature vectors using a fourth liveness test model.

The method of claim 8, wherein the determining of the post-liveness score based on the fourth liveness scores may include applying a weight to at least one of the fourth liveness scores, and determining the post-liveness score based on a result of the applying of the weight.

The determining of the post-liveness score may include determining the post-liveness score in response to the object being determined to be live based on the pre-liveness score.

The determining the liveness of the object may include determining the liveness of the object based on whether any one or any combination of the pre-liveness score and the post-liveness score satisfies a threshold condition.

The method may include determining whether the object is a pre-registered object based on the recognition model.

The determining of the post-liveness score may include determining the post-liveness score in response to the object being determined to be live based on the pre-liveness score, and the object being determined to be the pre-registered object.

In another general aspect, there is provided a liveness test apparatus including a processor configured to determine a pre-liveness score based on sub-images acquired from an input image, to determine a post-liveness score based on a recognition model for recognizing an object included in the input image, and to determine a liveness of the object based on any one or any combination of the pre-liveness score and the post-liveness score.

The processor may be configured to acquire different types of sub-images from the input image based on the object included in the input image, to determine liveness scores corresponding to the sub-images, and to determine the pre-liveness score based on the determined liveness scores.

The processor may be configured to determine fourth liveness scores from feature vectors output from hidden layers within the recognition model and to determine the post-liveness score based on the fourth liveness scores.

The processor may be configured to determine the fourth liveness scores from the feature vectors using a fourth liveness test model.

The processor may be configured to apply a weight to at least one of the fourth liveness scores, and to determine the post-liveness score based on a result of the applying of the weight.

The liveness test apparatus may include a memory configured to store instructions to be executed by the processor.

Other features and aspects will be apparent from the following detailed description, the drawings, and the claims.

Figure 1:
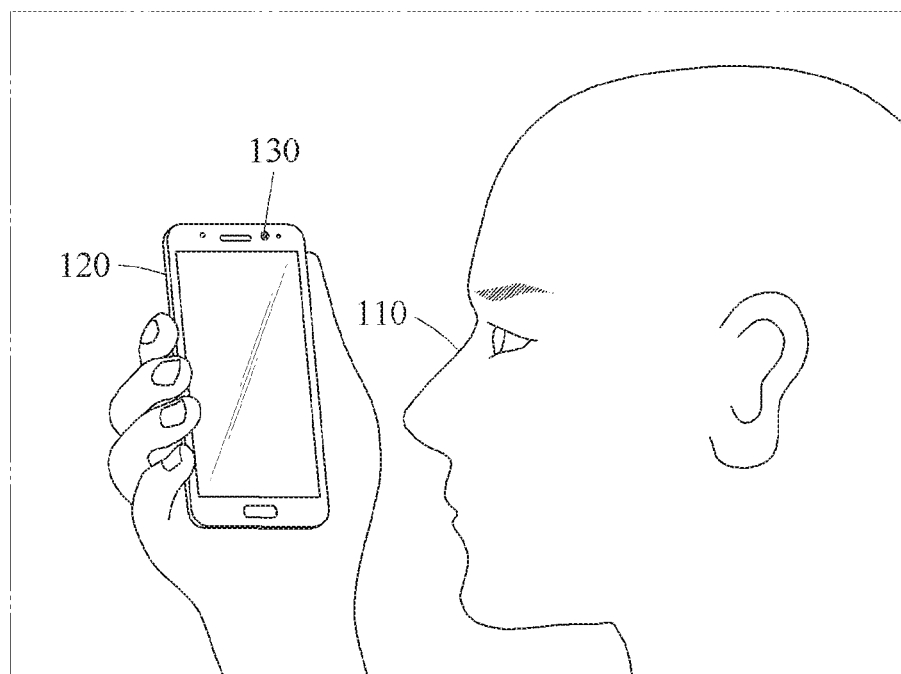
FIGS. 1 and 2 illustrate examples of a liveness test.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), and (b) may be used herein to describe components. However, such terms are not used to define an essence, order, or sequence of a corresponding component, but are used merely to distinguish the corresponding component from other components. For example, a component referred to as a first component may be referred to instead as a second component, and another component referred to as a second component may be referred to instead as a first component.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The terminology used herein is for the purpose of describing particular examples only, and is not intended to limit the disclosure or claims. The singular forms "a," "an," and "the" include the plural forms as well, unless the context clearly indicates otherwise.

Hereinafter, examples are described with reference to the accompanying drawings. The following structural or functional descriptions are provided only to describe the examples and should not be interpreted to be limiting. Various modifications and alterations may be made from the following description. Also, like numerals proposed in the drawings refer to like members through and known functions and structures are omitted.

Figure 2:
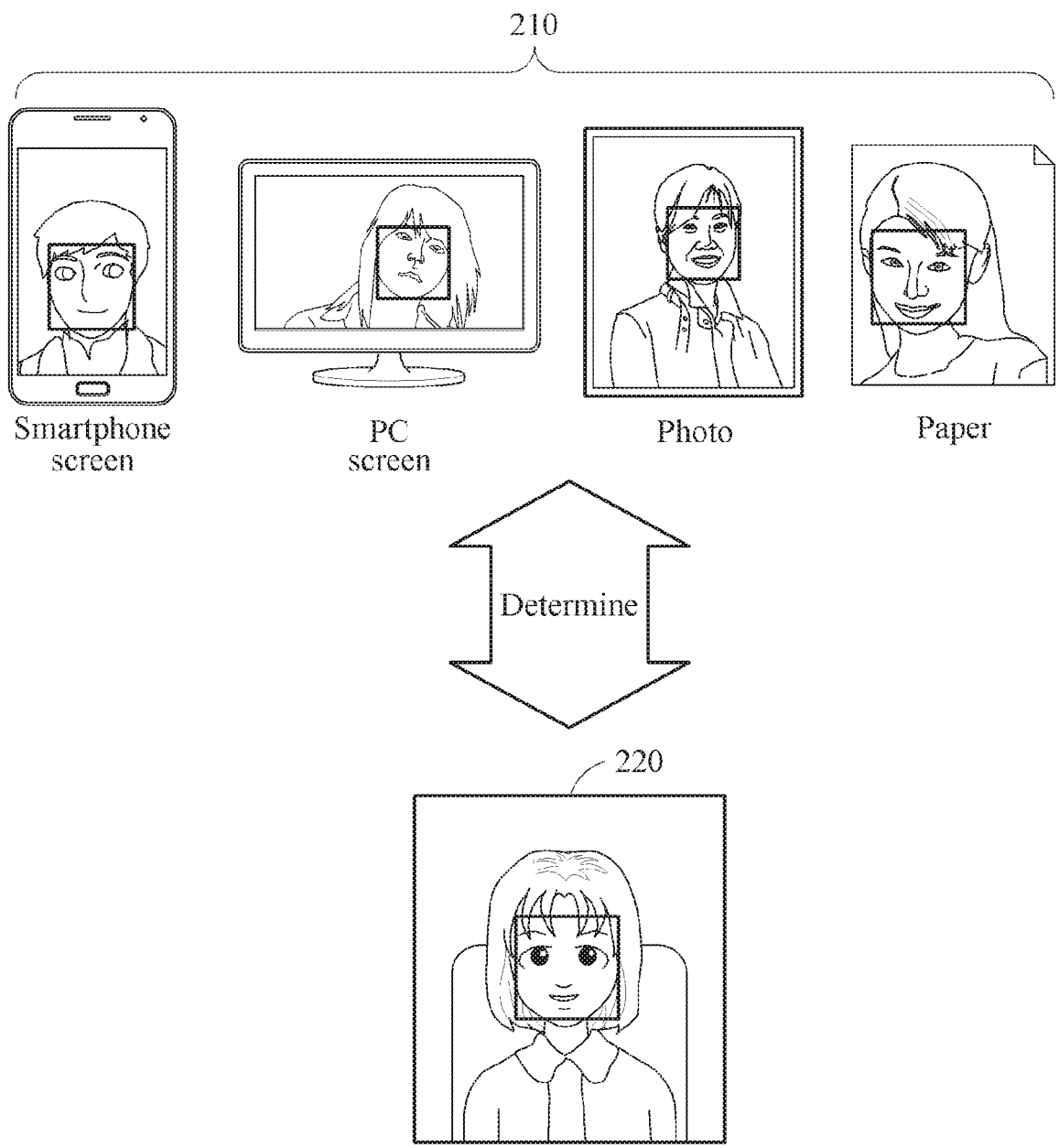

FIGS. 1 and 2 illustrate examples of a liveness test.

A liveness test refers to a test for determining whether a test subject is a live object. For example, the liveness test may be used to test whether a face in an image captured from a camera is a true face or a fake face. In one example, the liveness test may be used to test a liveness of a verification subject, i.e., a test subject in association with a user verification that is performed in, for example, a user log-in, a payment service, and an entrance control. In user verification, the liveness test may be used to distinguish a non-live object, for example, a photo, paper, an image, and a model, from a live object, for example, a live person.

An invalid user may attempt to cause a false acceptance of the user verification system using spoofing techniques. For example, in face verification, the invalid user may submit a color photo or a moving picture that includes a face of a valid user, or a model that mimics a facial shape of the valid user to a camera to cause false acceptance. The liveness test serves to filter out a verification attack, such as a spoofing attack that is launched using substitutes such as a photo, a moving picture, mask, or a model, and prevents the false acceptance. If the verification target is determined to not be live as a result of the liveness test, a user verification procedure is not executed. In another example, the user verification is determined as a failure in a final stage regardless of a result of the user verification.

Referring to FIG. 1, a liveness test apparatus is included in a computing device 120. In an example, the computing device 120 is a device, such as, for example, an intelligent agent, a mobile phone, a cellular phone, a smart phone, a wearable device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, communication systems, image processing systems, graphics processing systems, various Internet of Things (IoT) devices that are controlled through a network, a smart vehicle, an intelligent automobile, an autonomous driving vehicle, a vehicle starting device, a biometric door lock, a security device, other consumer electronics/information technology (CE/IT) device, or any other device capable of wireless communication or network communication consistent with that disclosed herein.

In one example, a user 110 attempts facial verification in the computing device 120. For example, if the user 110 attempts face verification to release a lock state of the computing device 120, i.e., to unlock the computing device 120. In an example, the computing device 120 acquires a facial image of the user 110 using a camera 130, analyzes the acquired face image, and determined whether to release a lock state of the computing device 120. If the user verification succeeds, the computing device 120 releases the lock state and allows access to the user 110. If the user verification fails, the computing device 120 remains in the lock state.

In one example, if the user 110 performs face verification in the computing device 120 to perform a payment service using the computing device 120, the computing device 120 may acquire a face image of the user 110. If the user 110 is recognized as a right user as a result of analyzing the face image, the computing device 120 approves a payment request, and otherwise refuses the payment request.

In one example, during the user verification processes, the liveness test of determining whether an object of the user verification is a live object may be performed by the liveness test apparatus either before or after a result of user verification is determined. If the verification subject is determined to be live as a result of performing the liveness test and also is recognized as a right user as a result of verification, the computing device 120 may release the lock state or may approve the payment request. If the verification subject is determined to not be the live object or is not recognized as the right user, the computing device 120 may continue to operate in the lock state or may refuse the payment request.

In an example in which the user verification process is performed prior to the liveness test process, the liveness test result may be determined as a failure although the user verification result is determined as a success, i.e., the verification subject may be determined as an object that is not live. In this case, a final result of the user verification may be determined as a failure.

During the liveness test, the liveness test apparatus may test a liveness of the object by collectively considering various factors present in an image captured from the camera 130. For example, the liveness test apparatus determines whether the test subject is live, i.e., the object is live based on any one or any combination of shape information of the entire face included in the captured image, texture information of a partial face, and context information. An image captured from the object present at a remote distance may include a clue regarding whether the object is a screen of an electronic device or paper. For example, a hand of the user holding the electronic device or the paper may appear in the image, which is used as a clue to determine whether the object is a fake. In an example, a fake attempt is effectively detected based on the context information. In an example, reflection of light and distortion of a shape is applied to the liveness test result based on shape information of the entire face. For example, optical reflection of a photo or paper that differs from that of a true face of a person. In another example, the bending or wrinkling of the photo or paper may cause the distortion of the shape. In an example, the liveness test is performed by considering one or more of these factors. A minute texture difference capable of distinguishing between the skin of a person and a screen of the electronic device/paper may be used based on the texture information. Accordingly, the liveness test apparatus may enhance the accuracy of the liveness test and may robustly perform the liveness test by collectively using various levels of liveness determination factors.

In an example, the liveness test apparatus tests the liveness of the object using a recognition model for recognizing a user face. For example, the liveness test apparatus determines liveness scores from the respective feature vectors output from a plurality of hidden layers within the recognition mode, and may determine whether the object is live based on the determined liveness scores. The recognition model may be trained based on many face images and may effectively extract features from a live real face. The liveness test apparatus may perform an effective liveness test at low cost by testing the liveness based on feature vectors output from the hidden layers of the recognition model.

FIG. 2 illustrates an example of a fake face 210 and a true face 220 determined by a liveness test apparatus. For example, the fake face 210 includes a smartphone screen, a user face displayed on a personal computer (PC) screen, a user face displayed on a photo, and a user face printed on paper.

Figure 3:
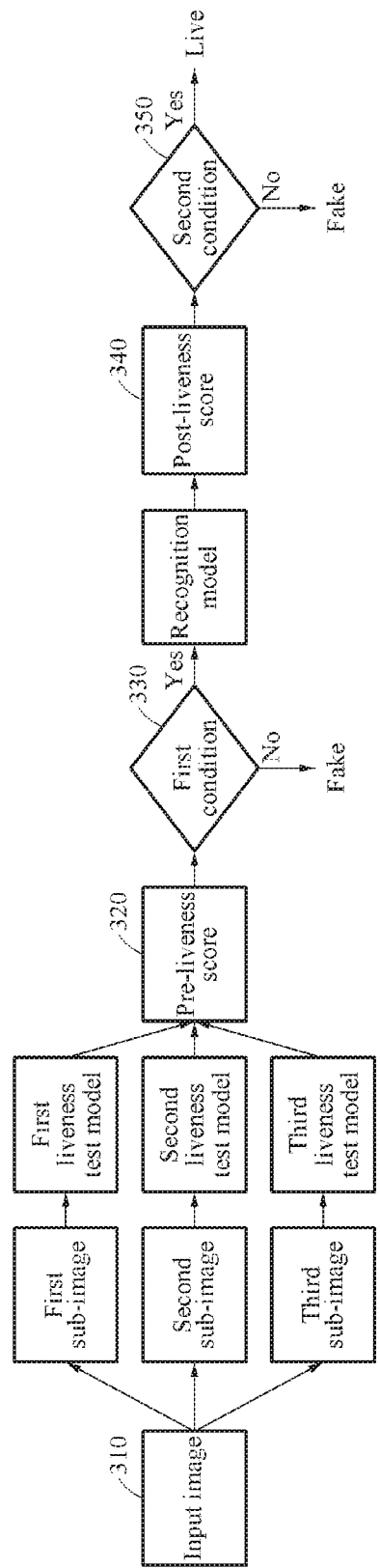
FIG. 3 illustrates an example of a method of a liveness test.

FIG. 3 illustrates an example of a of a liveness test.

Referring to FIG. 3, an input image 310 is acquired. The input image 310 includes an object that is a test subject, such as, an image captured from a camera. For example, the object may include a face, a palm, a fingerprint, an iris, and a limb as a body portion of a user.

In an example, plurality of sub-images is acquired from the input image 310. The plurality of sub-images includes, for example, a first sub-image corresponding to an object area that includes the object in the input image 310, a second sub-image corresponding to a partial area of the object area, and a third sub-image corresponding to the object area and a background area of the object as different types of sub-images. Other number and combinations of sub-images may be used without departing from the spirit and scope of the illustrative examples described.

Liveness scores are determined through liveness test models for each sub-image based on the respective liveness test model. A pre-liveness score 320 is determined based on the plurality of liveness scores.

The liveness of the object is determined based on whether the pre-liveness score 320 satisfies a first condition 330. In an example in which the pre-liveness score 320 has a value within a section of [0, 1] and the first condition 330 is set to 0.4, if the pre-liveness score 320 has a value greater than 0.4, the object is determined to be live and otherwise, the object is determined to not be live, i.e., to be a fake.

If the object is determined to be live based on the pre-liveness score 320, a post-liveness score 340 is determined based on a recognition model. A final decision on the liveness of the object may be made based on whether the post-liveness score 340 satisfies a second condition 350. In an example in which the post-liveness score 340 has a value within a section of [0, 1] and the second condition 350 is set to 0.5, if the pre-liveness score 320 has a value greater than 0.5, the final decision is made that the object is live and otherwise, the final decision is made that the object is not live, i.e., a fake. For example, the final decision on the liveness of the object may be made using the post-liveness score 340 by setting the first condition 330 to be less than the second condition 350.

In an examples, it is determined whether a combination between the pre-liveness score 320 and the post-liveness score 340 satisfies the second condition 350. The final decision on the liveness of the object may be made based on the result of the determination. In an example, the combination between the pre-liveness score 320 and the post-liveness score 340 may be determined by applying a weight to at least one of the pre-liveness score 320 and the post-liveness score 340.

Accordingly, the liveness of the object may be robustly determined even in a handicapped condition, for example, low illumination and backlight, and accuracy may be effectively improved.

Figure 4:
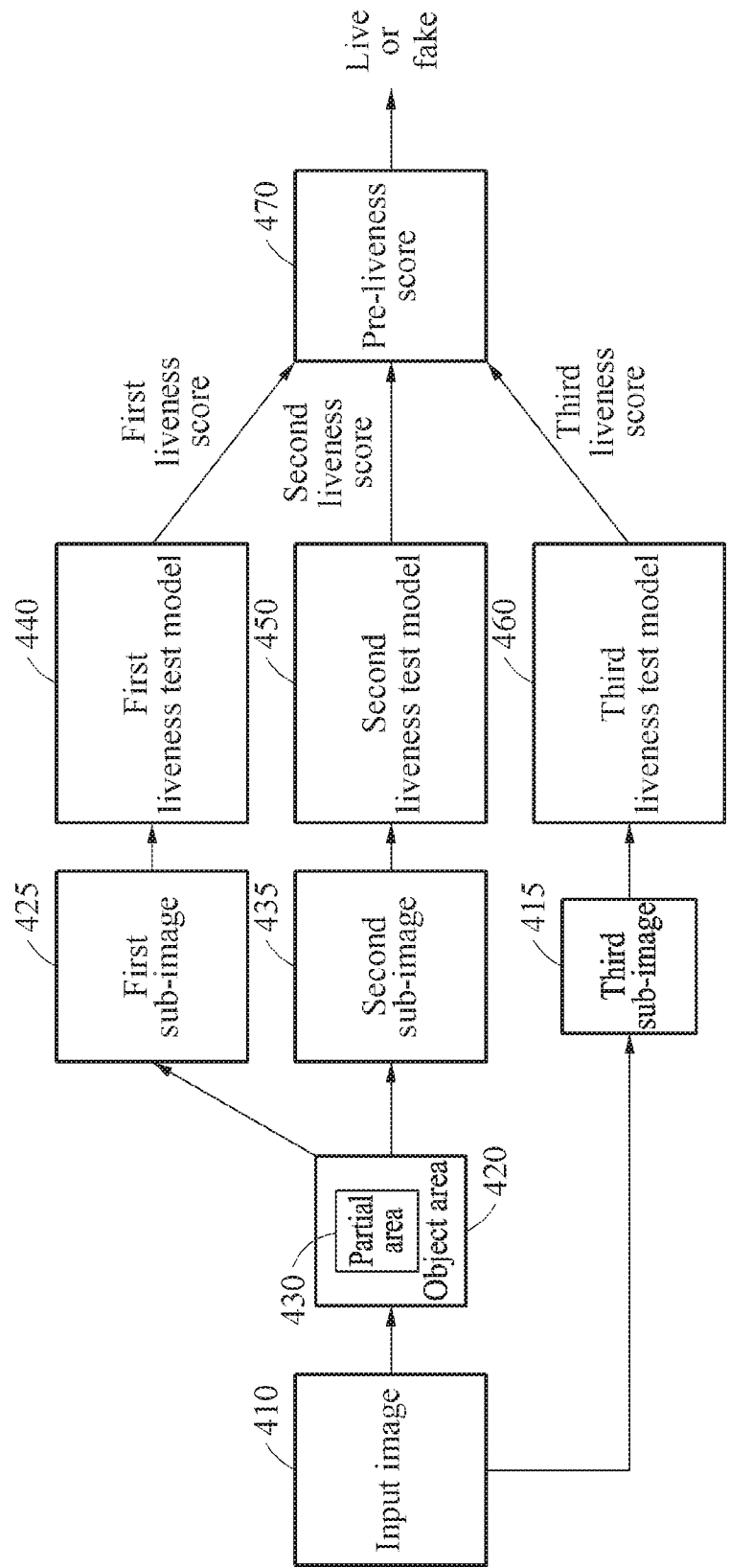
FIG. 4 illustrates an example of a process of determining a pre-liveness score.

FIG. 4 illustrates an example of a process of determining a pre-liveness score.

Referring to FIG. 4, an object area 420 is detected in an input image 410. Detection of the object area 420 is performed based an object detection schemes. Also, a partial area 430 of the object area 420 is determined. In an example, the partial area 430 is randomly determined within the object area 420.

A first sub-image 425 is acquired by resizing the object area 420 to a desired size. A second sub-image 435 is acquired by resizing the partial area to a desired size. A third sub-image 415 is determined by resizing a sum area of the object area 420 and a background area of an object. In an example, the background area represents a portion of a remaining area excluding the object area 420 in the input image 410 or the full input image 410.

Liveness scores corresponding to a plurality of sub-images are determined based on a plurality of neural network-based liveness test model. In an example, the liveness test model provides information, for example, a probability value or a feature value, for determining a liveness score of the object. The liveness test model may include a plurality of layers. The respective layers may include nodes and may be executed by a processor of a liveness data test apparatus. For example, the liveness test model may include an input layer, at least one hidden layer, and an output layer. Based on a structure of the neural network, nodes included in adjacent layers may be selectively inter-connected based on each connection weight. Data input to the liveness test model is processed and transformed while going through the nodes and is converted to a specific result value through the output layer.

In one example, the liveness test model may be based on a deep convolutional neural network (DCNN) including a plurality of hidden layers. The DCNN may include a convolution layer, a pooling layer, and a fully connected layer, and may provide information for determining a liveness of the object from image data that is input to the liveness test model through an operation process performed in each layer. In an example, the image data is a pixel value, for example, a color value and/or a brightness value, of pixels included in an image. The DCNN is provided as an example only and the liveness test model may operate based on a different structure of a neural network in addition to the DCNN.

Internal parameters of the liveness test model, such as a connection weight between nodes, may be determined through a training process of the liveness test model. For example, during the training process, a large number of training data and a desired value of the liveness test model corresponding to each piece of training data are present. In response to specific training data being input to the liveness test model, a process of adjusting the internal parameters of the liveness test model is performed such that the liveness test model outputs a desired value corresponding to the training data. In an example, a loss is calculated based on a difference between a result value output from the liveness test model and the desired value and the internal parameters of the liveness test model are adjusted to reduce the loss. By repeatedly performing the process on each piece of training data, the internal parameters may be adjusted to output a desirable output value from the liveness test model.

In one example, a liveness score may be determined by a liveness test model based on a type of a sub-image. For example, referring to FIG. 4, a first liveness score is determined from the first sub-image 425 by a first liveness test model 440. Also, a second liveness score is determined from the second sub-image 435 by a second liveness test model 450, and a third liveness score is determined from a third sub-image 415 by a third liveness test model 460.

The first, second, and third liveness test models 440, 450, and 460 may be trained based on corresponding types of images. For example, the first liveness test model 440 may be trained based on training data corresponding to a face area. The second liveness test model 450 may be trained based on training data corresponding to a partial area of the face. The third liveness test model 460 may be trained based on training data corresponding to the face area and a background.

In one example, a pre-liveness score 470 is determined based on the first, second, and third liveness scores. In an example, the pre-liveness score 470 is determined using a weighted average or arithmetic averages of the first through the third liveness scores.

In an example, the pre-liveness score 470 is determined by applying a weight to at least one of the first through the third liveness scores. For example, the weighted average may be calculated according to Equation 1.

$$Score_{pre}=0.3*Score_1+0.4*Score_2+0.3*Score_3 \quad \text{[Equation 1]}$$

In Equation 1, $Score_1$ denotes the first liveness score, $Score_2$ denotes the second liveness score, $Score_3$ denotes the third liveness score, and $Score_{pre}$ denotes the pre-liveness score 470. Here, the pre-liveness score 470 may have a value within a section of [0, 1].

The liveness of the object may be determined based on whether the determined pre-liveness score 470 satisfies a threshold condition.

Figure 5:
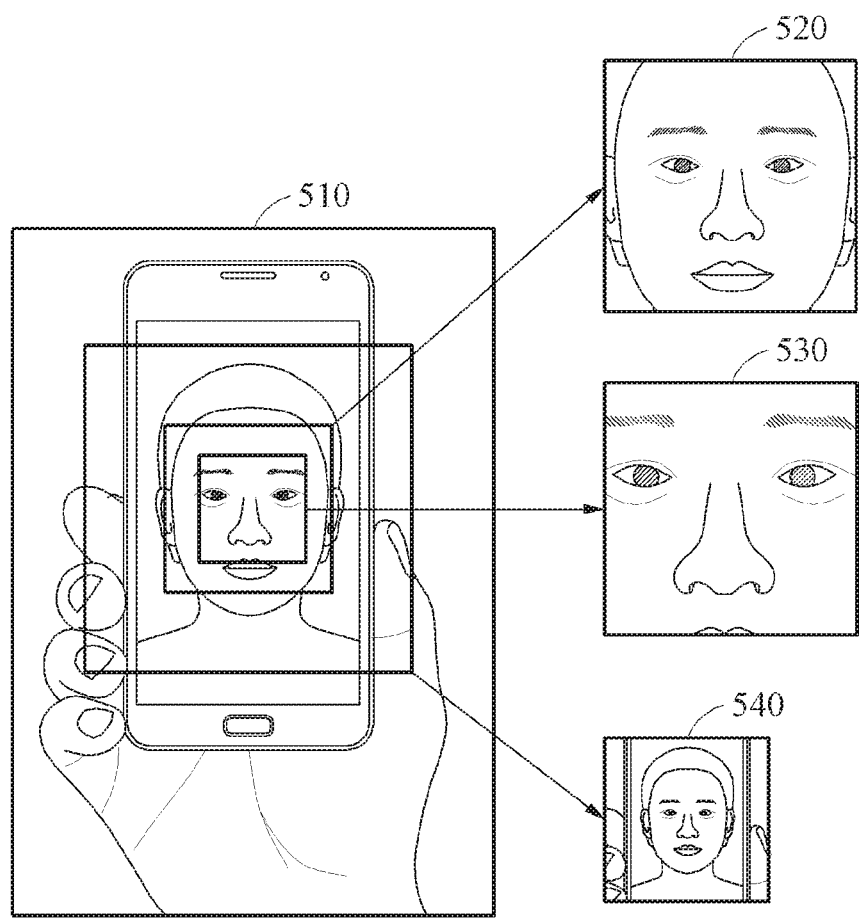
FIG. 5 illustrates example of sub-images.

FIG. 5 illustrates an example of sub-images.

Referring to FIG. 5, the sub-images include a first sub-image 520, a second sub-image 530, and a third sub-image 540 acquired from an input image 510.

In one example, the input image 510 is a captured image that is resized to have a size of 640×640. The first sub-image 520 is acquired by cropping a face area detected in the input image 510 and by resizing the cropped face area to have a size of 128×128. The second sub-image 530 is acquired by cropping a partial area that is randomly determined in the face area and by resizing the cropped partial area to have a size of 128×128. The third sub-image 540 is acquired by cropping a sum area of the face area and the background area and by resizing the cropped sum area to have a size of 64×64. The sizes of the input image 510, the first sub-image 520, the second sub-image 530, and the third sub-image 540 are provided as examples only and various sizes may be applicable to the sub-images without departing from the spirit and scope of the illustrative examples described.

Figure 6:
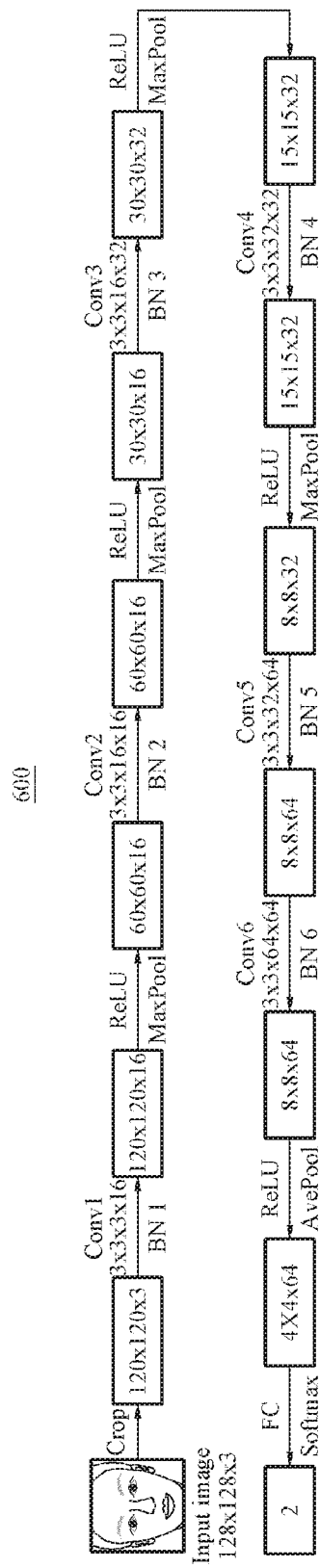
FIG. 6 illustrates an example of a liveness test model used to determine a pre-liveness score.

FIG. 6 illustrates an example of a liveness test model used to determine a pre-liveness score.

Referring to FIG. 6, an input image with a size of 128×128×3 is input to a liveness test model 600. In an example, the input image with the size of 128×128×3 includes three color channels of red, green, blue (RGB) with resolution of 128×128. The input image is cropped to 120×120×3. In an example, the liveness test model 600 includes six convolution layers. In an example, the six convolution layers includes 16 3×3×3 convolution kernels, 16 3×3×16 convolution kernels, 32 3×3×16 convolution kernels, 32 3×3×32 convolution kernels, 64 3×3×32 convolution kernels, and 64 3×3×64 convolution kernels, respectively. A number of convolution kernels included in a convolution layer increases to 16, 16, 32, 32, 64, and 64 sequentially as a convolution layer depth becomes deeper. Accordingly, representation capability of the liveness test model 600 may be enhanced.

In an example, the liveness test model 600 includes a batch normalization (BN) layer and a rectified linear unit (ReLU) layer and/or a pooling layer that are provided after at least one convolution layer and before a subsequent convolution layer. For example, BN layers BN1, BN2, BN3, BN4, BN5, and BN6 are provided after first through sixth convolution layers, respectively, and a normalized characteristic map may be acquired from a characteristic curve output from each convolution layer. In an example, a ReLU layer and a pooling layer are absent after the fifth convolution layer and before the sixth convolution layer. In an example, a pooling layer has a pooling area size of 2×2. In an example, a pooling layer after each convolution layer excluding the fifth and sixth convolution layers is a maximum pooling layer. In an example, an average pooling layer is provided after the sixth convolution layer. In an example, a fully connected layer and a softmax layer are provided after the average pooling layer followed by the sixth convolution layer. In this manner, a final output, i.e., the pre-liveness score of the liveness test model 600 may be acquired. Other number and configuration of layers in the liveness test model 600 are considered to be are considered to be well within the scope of the present disclosure.

Other number and configuration of layers in the liveness test model 600 are considered to be are considered to be well within the scope of the present disclosure. In an example, a different type pooling layer, for example, an averaging pooling layer and an L2 norm pooling layer, may be applied to the pooling layer. In an example, the ReLU layer may be replaced with an active layer, for example, a sigmoid layer and a tanh layer, having similar functions. In an example, the softmax layer may be replaced with a loss layer, for example, a sigmoid cross entropy layer and a Euclidean layer, having similar functions. A number of convolution kernels of each convolution layer and a size thereof are not limited to the structure of FIG. 6 and various structures may be applicable without departing from the spirit and scope of the illustrative examples described.

Figure 7:
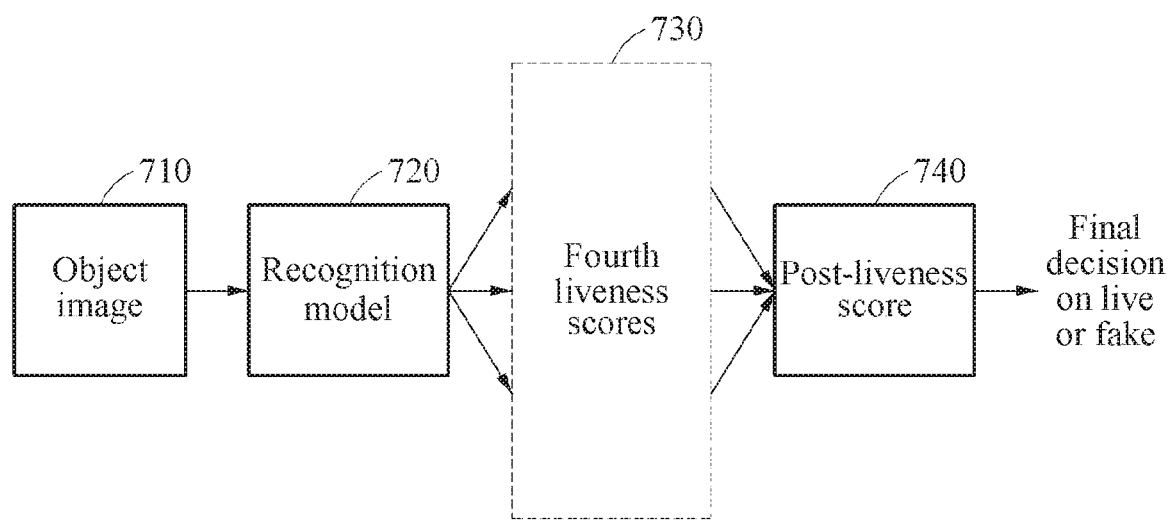
FIGS. 7 and 8 illustrate examples of a process of determining a post-liveness score.
Figure 8:
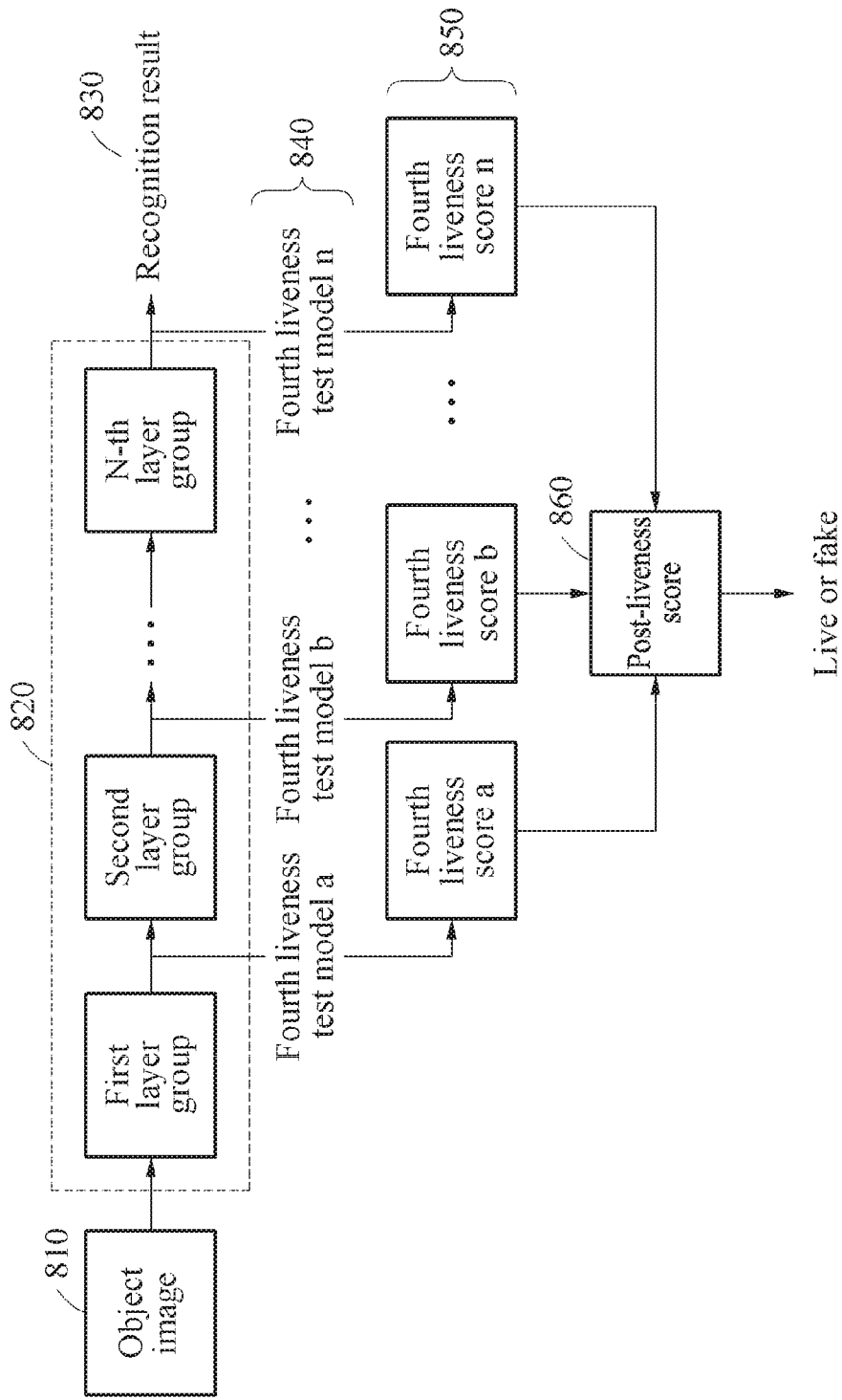

FIGS. 7 and 8 illustrate examples of a process of determining a post-liveness score.

Referring to FIG. 7, an object image 710 is input to a recognition model 720. The object image 710 refers to an image that includes an object. For example, the object image 710 may be an input image that includes the object or an image corresponding to an object area of the input image. The recognition model 720 refers to a model based on a neural network for recognizing the object. Fourth liveness scores 730 are determined based on feature vectors acquired from hidden layers within the recognition model 720. A post-liveness score 740 is determined based on the fourth liveness scores 730. In an example, a final decision on a liveness of the object is made based on the post-liveness score 740. Hereinafter, a post-liveness score determining process will be further described with reference to FIG. 8.

FIG. 8 illustrates an example of determining a post-liveness score based on a recognition model 820 and a fourth liveness test model.

The recognition model 820 may include a plurality of layers and a portion of the plurality of layers may be grouped into a single layer group. The layer group will be described with reference to FIG. 9.

When an object image 810 is input to the recognition model 820, feature vectors are output from hidden layers in the recognition model 820. For example, the feature vectors are output from the respective layer groups within the recognition model 820. In an example, each of the output feature vectors are input to a corresponding fourth liveness test model 840. In an example, the fourth liveness test model 840 determines a fourth liveness score of a corresponding feature vector. The fourth liveness test model 840 will be further described with reference to FIG. 10.

In an example, a post-liveness score 860 is determined based on fourth liveness scores. For example, the post-liveness score 860 is determined based on an average weight or arithmetic averages of fourth liveness scores. A weight may be applied to at least one of the fourth liveness scores to determine the post-liveness score 860. In an example, final decision on the liveness of the object, i.e., whether the object is live or a fake is made based on the post-liveness score 860.

In one example, whether the object included in the object image 810 is a pre-registered object may be determined based on the recognition model 820. For example, the pre-registered object may be pre-stored in a database and whether the object included in the object image 810 matches the registered object that is stored in a database may be determined based on the recognition model 820. Whether the object is the pre-registered object and/or object identification information may be output based on a recognition result 830 of the recognition model 820.

In one example, the recognition result 830 may be additionally used to determine the liveness of the object. For example, the post-liveness score 860 may be determined once the object is verified, for example, authenticated as the pre-registered object based on the recognition result 830. In another example, the post-liveness score 860 is determined before the object is verified as the pre-registered object based on the recognition result 830, the object may be determined to be live when the post-liveness score 860 satisfies a threshold condition and the object is verified as the pre-registered object based on the recognition result 830.

Figure 9:
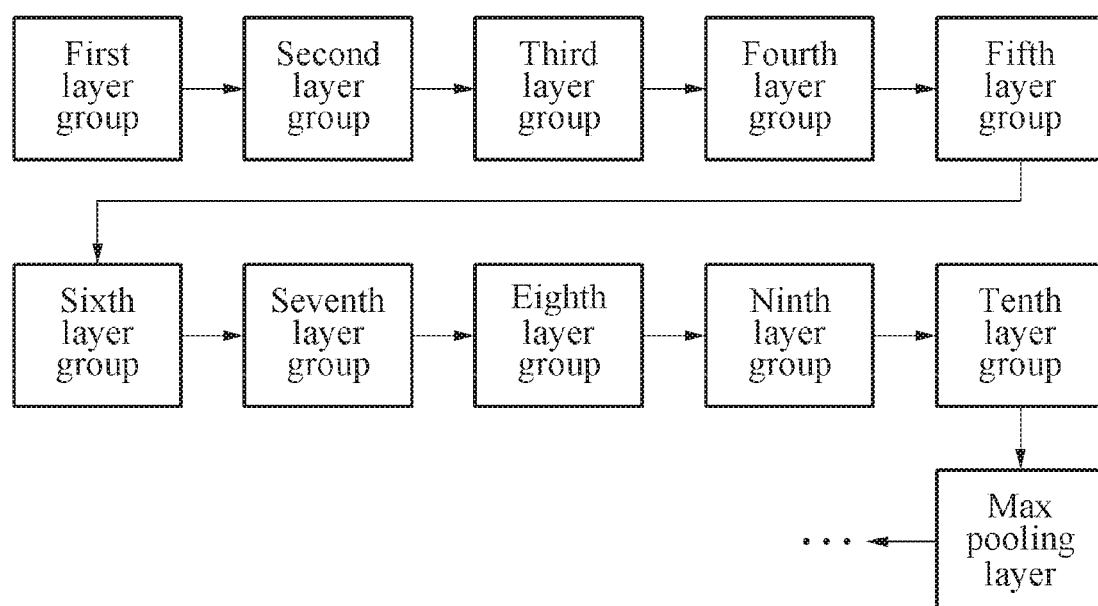
FIG. 9 illustrates an example of a layer group included in a recognition model.

FIG. 9 illustrates an example of a layer group included in a recognition model. Referring to FIG. 9, a layer group 900 includes a plurality of convolution layers and a maximum pooling layer.

The recognition model includes a plurality of layer groups. The layer group 900 includes, for example, 10 convolution layers and a single maximum pooling layer. However, FIG. 9 is provided as an example only and various numbers and structures of convolution layers and pooling layers may be applicable, without departing from the spirit and scope of the illustrative examples described. For example, another layer may be included in addition to a convolution layer and a pooling layer.

In an example, in addition to connections between layers of FIG. 9, an additional connection may be present. For example, a superposition between an output of a first convolution layer and an output of a third convolution layer may be input to a fourth convolution layer. Also, a further superposition between the super-position between the output of the first convolution layer and the output of the third convolution layer and an output of a fifth convolution layer may be input to a sixth convolution layer.

Figure 10:
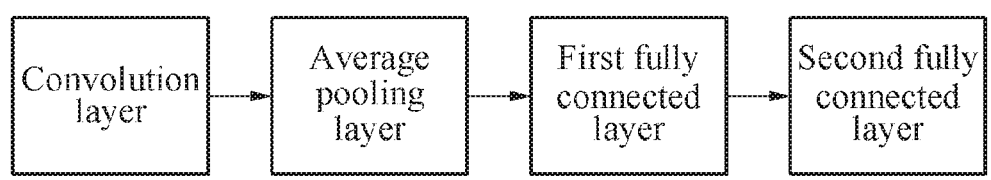
FIG. 10 illustrates an example of a fourth liveness test model used to determine a fourth liveness score.

FIG. 10 illustrates an example of a fourth liveness test model used to determine a fourth liveness score.

Referring to FIG. 10, a fourth liveness test model 1000 determines a fourth liveness score corresponding to a feature vector output from a hidden layer of a recognition model. For example, the fourth liveness test model 1000 includes a convolution layer, an average pooling layer, a first fully connected layer, and a second fully connected layer. However, it is provided as an example only for the fourth liveness test model 1000. Various numbers and/or structures of layers may be applicable without departing from the spirit and scope of the illustrative examples described. Another type layer, for example, a maximum pooling layer and an L2 norm pooling layer, may be applicable.

Figure 11:
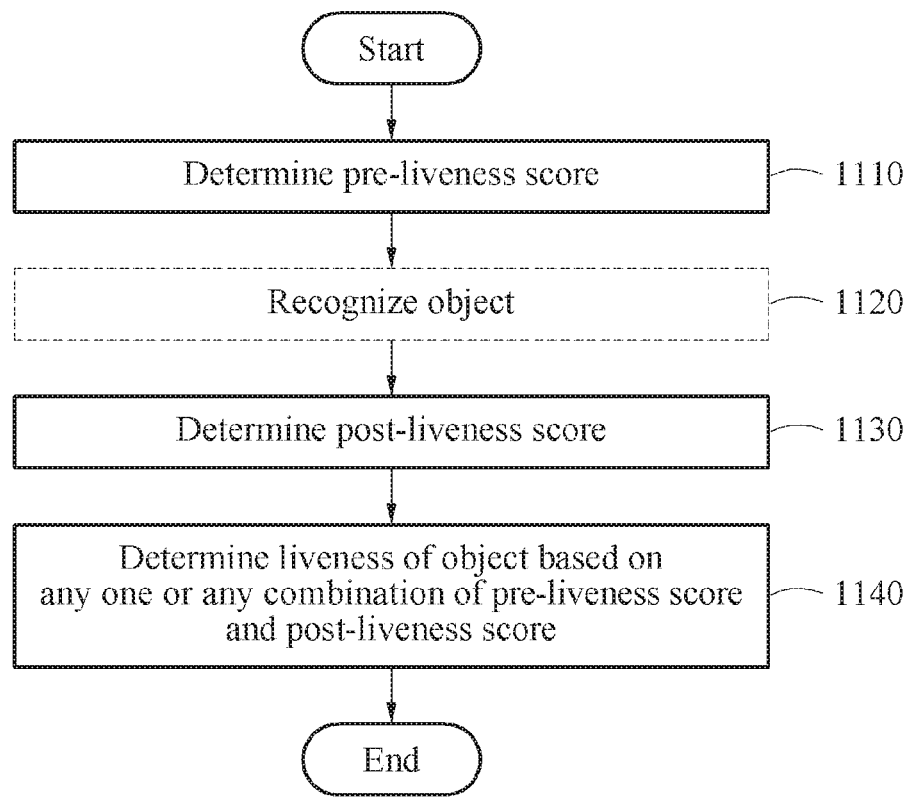
FIG. 11 is a diagram illustrating an example of a liveness test method.

FIG. 11 illustrates an example of a liveness test method. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions. In addition to the description of FIG. 11 below, the descriptions of FIGS. 1-10 are also applicable to FIG. 11, and are incorporated herein by reference. Thus, the above description may not be repeated here.

The liveness test method of FIG. 11 is performed by a processor of a liveness test apparatus.

In operation 1110, the liveness test apparatus determines a pre-liveness score based on a plurality of sub-images acquired from an input image. In an example, the liveness test apparatus acquires different types of a plurality of sub-images from the input image based on an object included in the input image, determined liveness scores corresponding to the plurality of sub-images, respectively. The liveness test apparatus determines a pre-liveness score based on the determined liveness scores.

In one example, the plurality of sub-images includes any two or any combination of a first sub-image corresponding to an object area that includes an object in the input image, a second sub-image corresponding to a partial area of the object area, and a third sub-image corresponding to the object area and a background area of the object. In an example, the determined liveness scores includes a first liveness score corresponding to the first sub-image, a second liveness score corresponding to the second sub-image, and a third liveness score corresponding to the third sub-image. In an example, the first liveness score is determined based on a first liveness test model, the second liveness score is determined based on the second liveness test model, and the third liveness score is determined based on the third liveness test model.

In one example, the liveness test apparatus resizes a size of the first sub-image, and determines the first liveness score corresponding to the first sub-image from the resized first sub-image using the first liveness test model. In an example, the liveness test apparatus acquires the second sub-image by cropping the partial area from the object area, and determines the second liveness score corresponding to the second sub-image from the second sub-image using the second liveness test model.

In operation 1120, the liveness test apparatus determines whether the object is a pre-registered object based on the recognition model. For example, the liveness test apparatus may determine whether the object matches the pre-registered object stored in a database through the recognition model. Depending on examples, operation 1120 may be omitted.

In operation 1130, the liveness test apparatus determines a post-liveness score based on the recognition model for recognizing the object included in the input image.

In an example, the liveness test apparatus determines fourth liveness scores from feature vectors output from a plurality of hidden layers within the recognition model, respectively. In an example, t, and may determine the post-liveness score based on the fourth liveness scores. In an example, the liveness test apparatus may determine the fourth liveness scores from the feature vectors, respectively, using the fourth liveness test model.

When the object is determined to be live based on the pre-liveness score determined in operation 1110, when the object is determined to correspond to the pre-registered object in operation 1120, or when a combination thereof is satisfied, the liveness test apparatus determines the post-liveness score.

In operation 1140, the liveness test apparatus determines a liveness of the object based on any one or any combination of the pre-liveness score and the post-liveness score. In an example, the liveness test apparatus determines the liveness of the object based on whether any one or any combination of the pre-liveness score and the post-liveness score satisfies a threshold condition.

Figure 12:
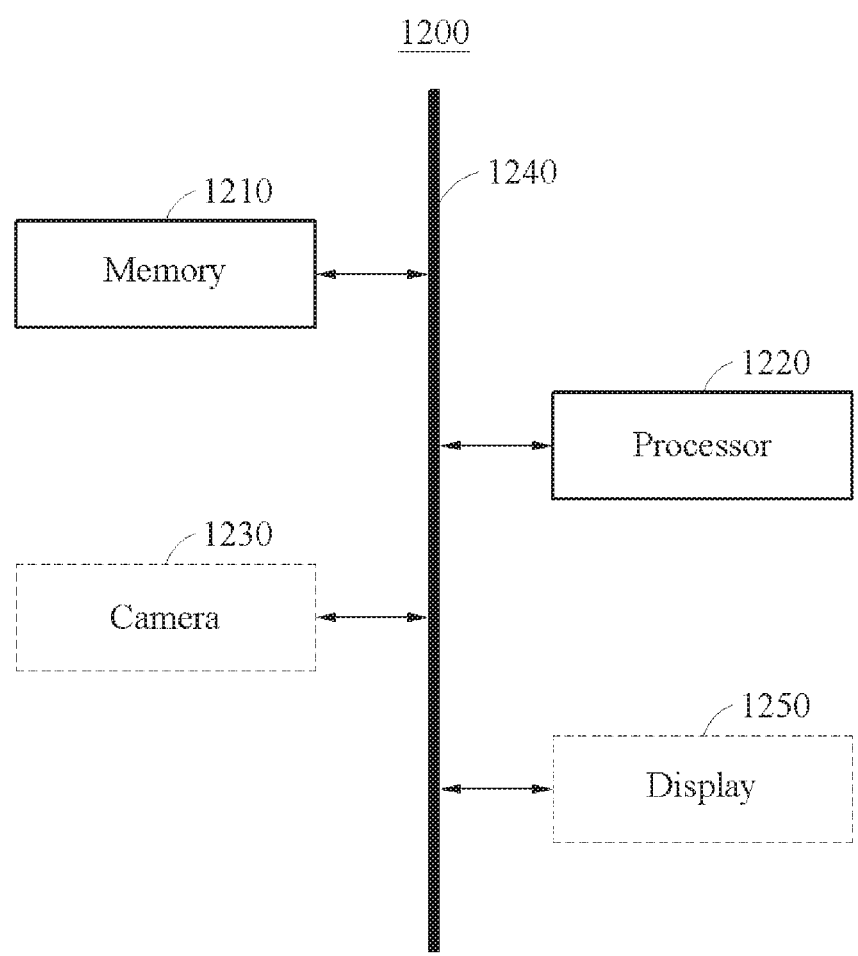
FIG. 12 illustrates an example of a liveness test apparatus.

FIG. 12 illustrates an example of a liveness test apparatus.

Referring to FIG. 12, a liveness test apparatus 1200 includes a memory 1210 and a processor 1220. Also, the liveness test apparatus 1200 further includes a camera 1230. Also, the liveness test apparatus 1200 further includes a display 1250. The memory 1210, the processor 1220, and the camera 1230 may communicate with one another through a bus 1240.

The memory 1210 includes computer-readable instructions. In response to an instruction stored in the memory 1210 being executed at the processor 1220, the processor 1220 performs the aforementioned operations. The memory 1210 may be a volatile memory or a non-volatile memory, and further description of the memory is provided below.

In another example, the liveness test apparatus 1200 provides the result of the liveness determination to a display 1250. In an example, the display 1250 is a physical structure that includes one or more hardware components that provide the ability to render a user interface and/or receive user input. The display 1250 can encompass any combination of display region, gesture capture region, a touch sensitive display, and/or a configurable area. In an example, the display 1250 is an external peripheral device that may be attached to and detached from the virtual lane generating device. The display 1250 may be a single-screen or a multi-screen display. A single physical screen can include multiple displays that are managed as separate logical displays permitting different content to be displayed on separate displays although part of the same physical screen. The display 1250 may also be the display of a smart phone or an eye glass display (EGD), which includes one-eyed glass or two-eyed glasses. In another example, the liveness test apparatus 1200 outputs the result of the liveness determination through an audio signal.

The processor 1220 may be an apparatus configured to execute instructions or programs or to control the liveness test apparatus 1200. The processor 1220 acquires an input image from the camera 1230, or receives the input image from an external apparatus through a wired or wireless network. The processor 1220 determines a pre-liveness score based on a plurality of sub-images acquired from the input image, determines a post-liveness score based on a recognition model for recognizing an object included in the input image, and determines a liveness of the object based on any one or any combination of the pre-liveness score and the post-liveness score. Further description of the processor 1220 is provided below.

The liveness test apparatus 1200 may perform the aforementioned operation.

The liveness test apparatus, liveness test apparatus 1200, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. The hardware components also access, manipulate, process, create, and store data in response to execution of the instructions or software. For simplicity, the singular term "processor" or "computer" may be used in the description of the examples described in this application, but in other examples multiple processors or computers may be used, or a processor or computer includes multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A liveness test method comprising:
   determining a first liveness score based on sub-images acquired from an input image;
   determining a second liveness score based on a recognition model for recognizing an object included in the input image, wherein the determining of the second liveness score comprises
   determining respective liveness scores from feature vectors output from hidden layers within the recognition model, and
   determining the second liveness score based on the respective liveness scores; and
   determining a liveness of the object based on any one or any combination of the first liveness score and the second liveness score.

2. The method of claim 1, wherein the determining of the respective liveness scores comprises:
   determining the respective liveness scores from the feature vectors using a liveness test model.

3. The method of claim 1, wherein the determining of the second liveness score based on the respective liveness scores comprises applying a weight to at least one of the respective liveness scores, and determining the second liveness score based on a result of the applying of the weight.

4. The method of claim 1, wherein the determining of the second liveness score comprises determining the second liveness score in response to the object being determined to be live based on the first liveness score.

5. The method of claim 1, wherein the determining the liveness of the object comprises determining the liveness of the object based on whether any one or any combination of the first liveness score and the second liveness score satisfies a threshold condition.

6. The method of claim 1, further comprising:
   determining whether the object is a pre-registered object based on the recognition model.

7. The method of claim 6, wherein the determining of the second liveness score comprises determining the second liveness score in response to the object being determined to be live based on the first liveness score, and the object being determined to be the pre-registered object.

8. A non-transitory computer-readable storage medium storing instructions that, when executed by a processor, cause the processor to perform the method of claim 1.

9. The method of claim 1, wherein the determining of the first liveness score comprises:
   acquiring different types of the sub-images from the input image based on the object included in the input image;
   determining liveness scores corresponding to the sub-images; and
   determining the first liveness score based on the determined liveness scores.

10. The method of claim 9, wherein the sub-images comprise any two or any combination of a first sub-image corresponding to an object area that includes the object, a second sub-image corresponding to a partial area of the object area, and a third sub-image corresponding to the object area and a background area of the object.

11. The method of claim 10, wherein the determined liveness scores comprise a first sub-image liveness score corresponding to the first sub-image, a second sub-image liveness score corresponding to the second sub-image, and a third sub-image liveness score corresponding to the third sub-image, and
   the first sub-image liveness score is determined based on a first liveness test model, the second sub-image liveness score is determined based on a second liveness test model, and the third sub-image liveness score is determined based on a third liveness test model.

12. The method of claim 10, wherein the determining of the liveness scores comprises:
   resizing a size of the first sub-image; and
   determining a first sub-image liveness score from the resized first sub-image using a first liveness test model.

13. The method of claim 10, wherein the determining of the liveness scores comprises:
   acquiring the second sub-image by cropping the partial area from the object area; and
   determining a sub-image liveness score from the cropped second sub-image using a liveness test model.

14. The method of claim 9, wherein the determining of the first liveness score based on the determined liveness scores comprises applying a weight to one or more of the determined liveness scores, and determining the first liveness score based on a result of the applying of the weight.

15. A liveness test method comprising:
   determining a pre-liveness score based on sub-images acquired from an input image;
   determining a post-liveness score based on a recognition model for recognizing an object included in the input image; and determining a liveness of the object based on any one or any combination of the pre-liveness score and the post-liveness score, wherein the determining of the pre-liveness score comprises:

acquiring different types of the sub-images from the input image based on the object included in the input image;

determining liveness scores corresponding to the sub-images; and determining the pre-liveness score based on the determined liveness scores.

16. The method of claim 15, wherein the sub-images comprise any two or any combination of a first sub-image corresponding to an object area that includes the object, a second sub-image corresponding to a partial area of the object area, and a third sub-image corresponding to the object area and a background area of the object.

17. The method of claim 16, wherein the determined liveness scores comprise a first liveness score corresponding to the first sub-image, a second liveness score corresponding to the second sub-image, and a third liveness score corresponding to the third sub-image, and the first liveness score is determined based on a first liveness test model, the second liveness score is determined based on a second liveness test model, and the third liveness score is determined based on a third liveness test model.

18. The method of claim 16, wherein the determining of the liveness scores comprises:

resizing a size of the first sub-image; and determining a liveness score of the liveness from the resized first sub-image using a first liveness test model.

19. The method of claim 16, wherein the determining of the liveness scores comprises:

acquiring the second sub-image by cropping the partial area from the object area; and determining a liveness score of the liveness from the cropped second sub-image using a second liveness test model.

20. The method of claim 15, wherein the determining of the pre-liveness score based on the determined liveness scores comprises applying a weight to one or more of the determined liveness scores, and determining the pre-liveness score based on a result of the applying of the weight.

21. Aliveness test apparatus comprising:

a processor configured to determine a first liveness score based on sub-images acquired from an input image, to determine a second liveness score based on a recognition model for recognizing an object included in the input image, and to determine a liveness of the object based on any one or any combination of the first liveness score and the second liveness score, wherein the processor is further configured to determine respective liveness scores from feature vectors output from hidden layers within the recognition model and to determine the second liveness score based on the respective liveness scores.

22. The liveness test apparatus of claim 21, wherein the processor is further configured to determine the respective liveness scores from the feature vectors using a liveness test model.

23. The liveness test apparatus of claim 21, wherein the processor is further configured to apply a weight to at least one of the respective liveness scores, and to determine the second liveness score based on a result of the applying of the weight.

24. The liveness test apparatus of claim 21, further comprising a memory configured to store instructions to be executed by the processor.

25. A liveness test apparatus comprising:

a processor configured to determine a first liveness score based on sub-images acquired from an input image, to determine a second liveness score based on a recognition model for recognizing an object included in the input image, and to determine a liveness of the object based on any one or any combination of the first liveness score and the second liveness score, wherein the processor is further configured to acquire different types of sub-images from the input image based on the object included in the input image, to determine liveness scores corresponding to the sub-images, and to determine the first liveness score based on the determined liveness scores.

* * * * *